Nov. 17, 1964 W. A. PFAFF 3,157,102
PRINTER-PROCESSOR APPARATUS
Filed May 28, 1963 2 Sheets-Sheet 1

INVENTOR:
WILLIAM A. PFAFF,
BY
Earnest P. Marmorek,
HIS ATTORNEY.

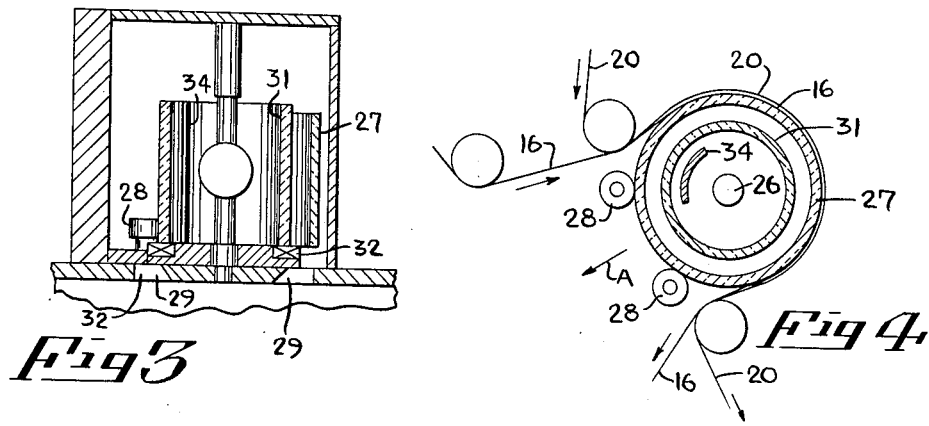
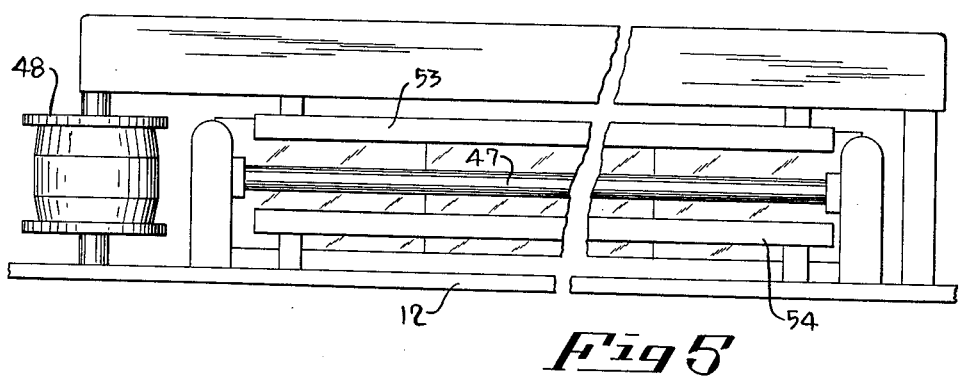
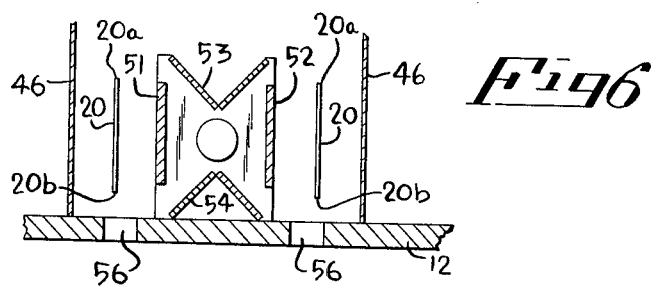
INVENTOR:
WILLIAM A. PFAFF,
HIS ATTORNEY.

3,157,102
PRINTER-PROCESSOR APPARATUS
William A. Pfaff, Huntington, N.Y., assignor, by mesne assignments, to Victoreen Instrument Company, Cleveland, Ohio, a corporation of Ohio
Filed May 28, 1963, Ser. No. 283,936
8 Claims. (Cl. 95—75)

The invention relates to photo-printing and processing, and relates more particularly to a printer-processor for a film of the type known as "Kalvar" film or sometimes also as "Kalfax" microfilm.

In the ensuing specification, the term "Kalvar" film will be used, which term is intended to include "Kalfax" microfilm and similar films under other trade names or trademarks.

"Kalvar" film is a type film that comprises a base and an emulsion composed of a high-polymer plastic including a light-sensitive diazo compound. Reference is made to the article "The Miraculous Bubble: A Look at Kalfax Microfilm," 3 Library Resources & Technical Services 40–46 (1959), and the bibliography cited therein. Such "Kalvar" film is exposed by light and developed by heat alone.

The instant invention relates to a printer-processor which produces negative copies from a positive master, such as a positive roll film, or positive copies from a negative master, such as a negative roll film.

Desirable features for such a printer-processor include means for a light-heat-light process, the first light exposing, the heat developing, and the last light fixing the film, but previous apparatus of this type were deficient therein that neither the light exposure nor the heat exposure were sufficiently controlled, nor the heat rays during the light exposure sufficiently or economically and efficiently separated from the light rays.

It is accordingly among the principal objects of the invention to provide a printer-processor that avoids the aforesaid deficiencies of the prior art.

It is a further object of the invention to provide an apparatus that will effectively cool the film during light exposure, and provide for adequate cooling means.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the specification.

The foregoing and other objects of the invention will be best understood from the following description of an exemplification thereof, reference being had to the accompanying drawings, wherein:

FIG. 3 is a large scale fragmentary sectional view, taken on the line 3—3 of FIG. 1;

FIG. 4 is a schematic sectional view, taken on the line 4—4 of FIG. 3;

FIG. 5 is a fragmentary sectional view taken on the line 5—5 of FIG. 1; and

FIG. 6 is a fragmentary sectional view taken on the line 6—6 of FIG. 1.

Figure 1:
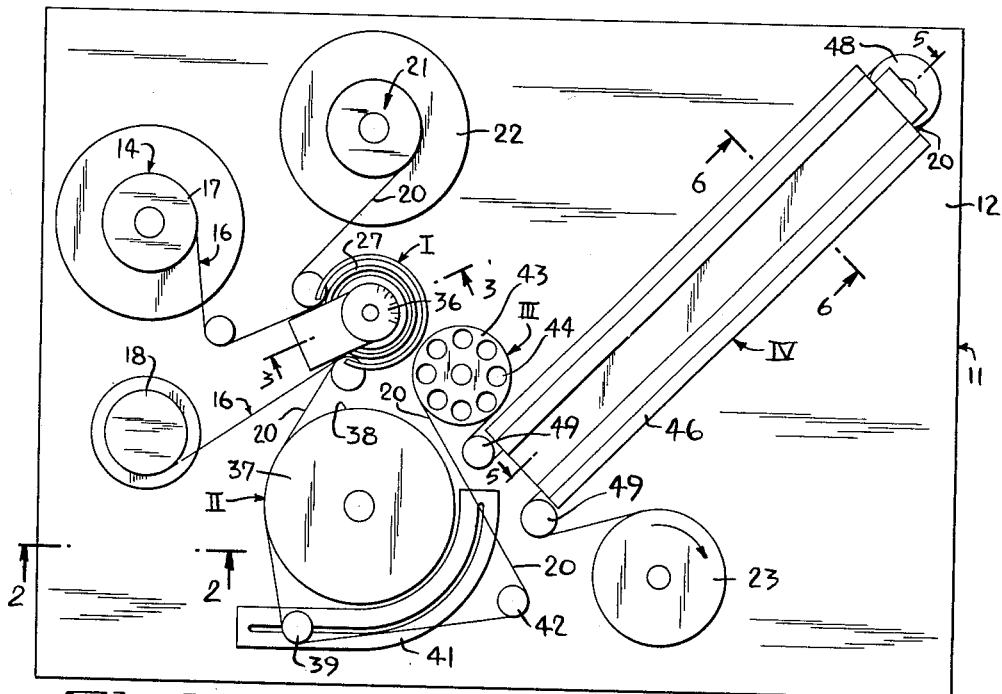
FIG. 1 is a plan view of a printer-processor apparatus in accordance with the invention.
Figure 2:
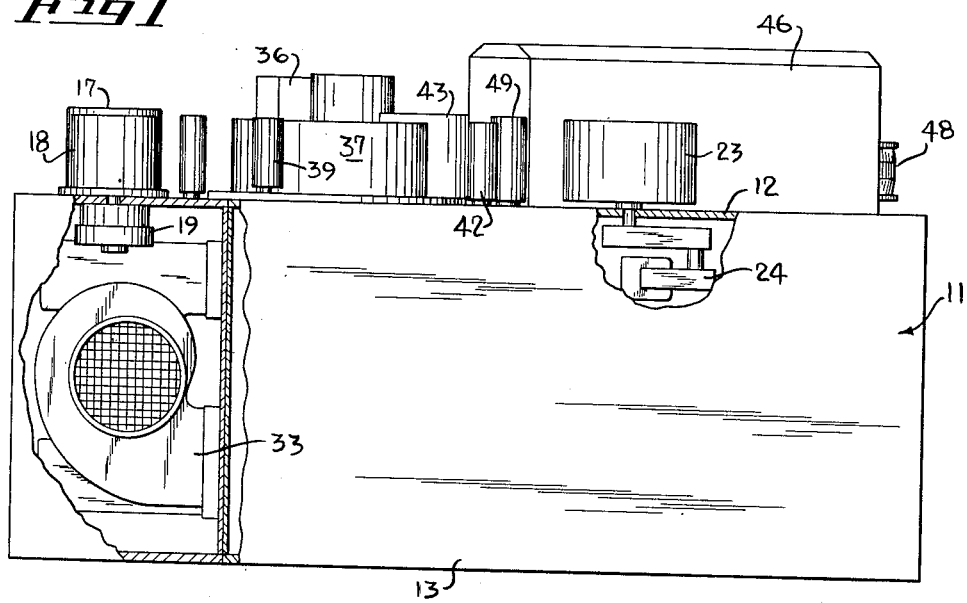
FIG. 2 is a side elevational view thereof, partly in section, taken on the line 2—2 of FIG. 1.

In carrying the invention into effect in one of the embodiments which has been selected for illustration in the accompanying drawings and for description in this specification, and referring now particularly to FIGS. 1 and 2, there is provided a printer-developer apparatus, generally indicated at 11. The apparatus 11 comprises a platform 12 which may constitute the top of an enclosure structure, such as an enclosed vessel 13. Reel means 14 for an elongated master 16 may be provided and include a take off reel 17 and a take-up reel 18, and driving means for the take-up reel 18, such as, for instance, an electric motor 19 (FIG. 2).

Similar means, such as movable means for the "Kalvar" film 20 are provided, such as, for instance, a take-off spool 22 and a take-up spool 23. Driving means for the take-up spool 23 are provided, for instance, an electric drive motor 24 (FIG. 2).

Either or both motors 19 and 24 may be variable speed direct current motors.

The film 20 is threaded through various stages, for instance, four stages of the apparatus 11 between take-off and take-up. These stages include a first light exposure stage I, a heating stage II for film development, a cooling stage III after the developing through heat, and a fixing stage IV in which the film is exposed to light.

Only in the first of these, the stage I, do the film 20 and the master 16 travel together. After the first stage, the master 16 is rolled up on the take-up reel and does not participate any further in the process.

In the stage I, there is provided a source of light which, preferably, is substantially a point-type source of light 26, which may be a point-type electric bulb, as shown in FIG. 3. A guide is provided, such as a cylinder 27 that is freely rotatable concentrically about the point light source 26. The glass cylinder 27 is composed of heat resistant glass of suitable well-known composition, for instance, of "Pyrex" glass.

As best shown in FIG. 4, the master 16 engages the external surface of the glass cylinder 27 throughout a predetermined peripheral arc or angle of about 270°. The film 20 is throughout that arc in contact with the master 16. The master 16, as well as the film 20, exert, while they are strapped about the glass cylinder 27 throughout about three-fourths of the periphery thereof, pressure in the direction A (FIG. 4). Two rolls 28 are provided to take up the pressure A and to render the cylinder 27 freely rotatable even under that pressure. As shown in FIG. 4, the rolls 28 are clear of the path of the master 16 or the film 20. As best shown in FIG. 3, the cylinder 27 is supported freely rotatable, for instance, on a bearing surface 29.

As the master 16 and the film 20 are guided by the cylinder 27 concentrically in a wrap-around position about the point light 26, succeeding portions of the film 20 are exposed through the master 16 by the light. On such exposure the suspended diazo particles of the film are decomposed into a dye residue and a gas. The number of visible gas bubbles in the film is directly proportional to the amount of light received.

Subsequently, the film is developed by heat, for instance, at about 255° F.; the heating process softens the emulsion and allows each pressure center set up by the gas bubbles in the plastic to reconstruct the plastic in its immediate vicinity.

As the heat is used for developing, the exposure of the film to heat during the light exposure should be kept to a minimum. The instant invention, accordingly, provides for shielding means, such as an annular stationary shielding cylinder 31 that is composed of infra-red absorbing glass of well-known suitable composition. This shielding means absorbs at least some of the heat radiated by the bulb 26. This arrangement offers the advantage that the bulb itself need not be cooled, thus leaving the bulb uncooled and transferring the heat absorption and cooling away from the bulb.

In order to cool the shielding cylinder 31, cooling means are provided which include apertures, such as ports 32 formed in the platform 12, and which communicate with the interior of the vessel 13. A blower 33 (FIG. 2) is arranged in that vessel and when operative will deliver cooling air from the confinement of the vessel 13 through the ports 32 to the vicinity of the shielding cylinder 31, to carry away from the shielding cylinder 31 hot air as heated by said shielding cylinder 31.

In order to control the angle of exposure of the succeeding portions of the film 20 during the wrap-around position of the latter on the rotatable glass cylinder 27, there are provided shutter means, such as an arcuate opaque shutter 34. The shutter 34 has an arc that is concentrical with the point light source 26 and the glass cylinder 27 and shielding cylinder 31, respectively, but it has a radius which is smaller than that of the glass cylinder 27 and may also be smaller than the radius of the shielding cylinder 31. The shutter 34 is positionable by means of a shutter guide 36 (FIG. 1), to adjust the light exposure of the film in the stage I.

In the succeeding stage II, there is provided a heater, such as a freely rotatable hot roller or heating cylinder 37 which has a wall that includes or is composed of heat conducting material, such as metal. The film 20 engages the external surface 38 of the heating cylinder 37 throughout a peripheral arc thereof.

Means are provided to adjust the arc of the engagement between the film 20 and the surface 38 on the heating cylinder 37; this means comprises a rotatable roll 39 that is adjustably positionable on a stationary track 41 that adjoins the external surface 38 of the heating cylinder 37. A fixed reserve roll 42 is provided outside the track 41. The roll 39 guides the film 20 off the surface 38 of the heating cylinder 37; and the position of the roll 39 on the track 41 determines the arc of engagement between the film 20 and the cylinder surface 38. From the roll 39, the film 20 is guided to the reserve roll 42, and from there to the stage III, the heat sink stage.

In the stage III, there is provided a cooling means, such as a rotatable cooling member or cooling drum 43. The cooling drum 43 acts as a heat sink, to cool the film 20 after it has been heated for development in the heating stage II.

The cooling drum 43 has a series of passages 44 parallel of its axis of rotation, and apertures are provided (not shown in the drawing) in the platform 12, similar to the apertures 32, for blowing cooling air from the vessel 13 through the passages 44. Thus, the film has been exposed, and developed by heat, and has now again been cooled. It is now ready for fixing by exposing the entire film to another light source, in the succeeding stage IV.

In the fourth stage there is provided a frame 46 suspending an elongated substantially linear type light source, such as a straight bulb 47. Means are provided near the frame 46, such as a main guide roll 48 and two auxiliary rolls 49 for guiding the film 20 in U-formation along two sides of the bulb 47. A shield is provided on both sides of the bulb 47, such as an entrance shield part 51 and an exit shield part 52. These parts are again formed of infrared absorbing material.

The long U-shaped path of the film is designed to expose to the light rays of the bulb 47 all the portions of the film in succession. In order to ascertain that also the edge portions 20a and 20b of the film 20 are adequately exposed to the light in the stage IV, an upper reflector 53 and a lower reflector 54 of wedge-shaped structure are provided above and below, respectively, of the bulb 47 and suspended in the frame 46. As evident from FIG. 6, the reflectors 53 and 54 will aid in the substantially complete exposure of the entire film 20 including the edge portions 20a and 20b thereof.

Cooling means are provided to cool the parts 51 and 52 of the shield. These cooling means include apertures or ports 56 which are formed in the platform 12 and through which the blower 33 will deliver cooling air to the shield, blowing away the hot air developed by the shield.

A shutter or shutters may be provided for adjustment of the blowing air in the stage I, III or IV. Thereafter, the film 20 will be rolled up on the take-up spool 23.

The operation of the above described apparatus will be entirely obvious to the skilled artisan. The apparatus will include, without need to describe it herein, such spools and sprocket wheels as are necessary for the normal operation of the apparatus. The operator will thread the master 16 and the film 20 through the stage I, and the film furthermore through the stages II, III and IV. He will attach the master 16 to the take-up reel 18, and the film 20 to the take-up spool 23 and will then energize the light sources 26 and 47, and the hot roller 37, as well as the blower 33. He will adjust the shutter 34 to the desired position. Then he will switch on the motors 19 and 24. The rest is automatic.

An air filter (not shown) may be provided to eliminate the dirt from the blowing air. The developing and printing speed may be varied, for instance from about 5 feet per minute to about 50 feet per minute. The hot roller 37 may have a 200 watt heating element with adjustable temperature. Cooling by blowing has the advantage to prevent the accumulation of dust, yielding a better end product.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a printer-processor apparatus for a "Kalvar" film of the type comprising a base and an emulsion composed of a high-polymer plastic including a light-sensitive diazo compound, and having actuatable reel means for an elongated master and movable means operable for propelling said film through a path: the combination of
   (a) a freely rotatable guide, a substantially point-type source of light disposed centrally of said guide, said master and film being guided in close proximity of each other arcuately along a major portion of the periphery of said guide for continuous light ray exposure through said master of succeeding portions of the film, shielding means operable to absorb at least some of the heat radiated by said point light source towards the film, means operable for cooling the shielding means, and shutter means positionable for selectively varying the angle of exposure of said film portions from the point light source;
   (b) a heater operable for developing said film by heating the successive film portions;
   (c) a rotatable cooling member continuously being cooled and engaging said film continuously to draw heat from the film; and
   (d) an elongated substantially linear type light source, said film being guided along two sides of said linear slight source and exposed to the light rays thereof for film fixing, a shield operable to absorb at least some of the heat radiated by said linear light source towards said film, and means operable for cooling the shield.

2. In a printer-processor apparatus for a "Kalvar" film of the type comprising a base and an emulsion composed of a high-polymer plastic including a light-sensitive diazo compound, and having actuatable reel means for an elongated master and movable means operable for propelling said film through a path: the combination of
   (a) a substantially point-type source of light, a guide operable to move said film together with the master arcuately throughout a major portion of the periphery about said point source of light for continuous light ray exposure through said master of succeeding portions of the film, shielding means operable to absorb at least some of the heat radiated by said point light source toward the film, means operable for cooling the shielding means, and shutter means positionable for selectively varying the exposure time of said film portions from the point light source;

(b) a heater operable for exposing successive portions of the film without the master to heat rays thereby developing said film;

(c) means operable for cooling the film portions continuously; and (d) an elongated substantially linear type light source, said film being guided along said linear light source and exposed to the light rays thereof for film fixing, a shield operable to absorb at least some of the heat radiated by said linear light source towards said film, and means operable for cooling the shield.

3. In a printer-processor apparatus, as claimed in claim 2, said means operable for cooling comprising a blower, and apertures defined adjacent said shielding means and said cooling stage and said shield, and confining means establishing a connection between said blower and said apertures for delivering cooling air through said apertures.

4. In a printer-processor apparatus, as claimed in claim 2, said means operable for cooling comprising a substantially air-tight vessel structure, ports defined in said vessel structure adjacent said shielding means and said shield and said cooling stage, and a blower disposed in said vessel and operable to force air out of said vessel through said ports.

5. In a printer-processor apparatus, as claimed in claim 2, said guide comprising a freely rotatable cylinder composed of heat resistant glass, said master engaging a portion of the periphery of said glass cylinder and exerting pressure against said glass cylinder, aid film being in contact with the master and exerting pressure against the master and thereby against the glass cylinder, and rotatably journalled rolls disposed clear of the path of the film and of the master and engaging the glass cylinder rotatably and being operable to take up said pressures, said shielding means and said shield being composed of infra-red rays absorbing glass.

6. In a printer-processor apparatus, as claimed in claim 2, said guide including a glass cylinder freely rotatable concentrically about said point light source and being operable to be engaged at its exterior by the master in turn partially enveloped by the film, said shutter means comprising an arcuate opaque member disposed concentrically with said point light source and rotatable coaxially thereof about a radius smaller than the radius of the glass cylinder.

7. In a printer-processor apparatus, as claimed in claim 2, said heater of said developing stage comprising a rotatable heating cylinder having a wall including heat conducting material, said film engaging the external surface of said wall throughout a peripheral arc of the heating cylinder, and means operable for adjusting the arc of said engagement comprising a rotatable roll, a stationary track for said roll adjacent said heating cylinder wall, said roll being adjustably positionable on said track, said roll guiding said film off said heating cylinder.

8. In a printer-processor apparatus, as claimed in claim 2, together with a frame suspending said linear light source and said shield, said shield comprising two elongated strips of infra-red rays absorbing glass, means suspending said film outside said glass strips, an upper and a lower substantially V-shaped reflector supported by said frame between said glass strips operative to reflect the light from said linear source towards the edge portions of the film.

No references cited.